United States Patent [19]

Stockner et al.

[11] Patent Number: 5,392,749
[45] Date of Patent: Feb. 28, 1995

[54] HYDRAULICALLY-ACTUATED FUEL INJECTOR SYSTEM HAVING SEPARATE INTERNAL ACTUATING FLUID AND FUEL PASSAGES

[75] Inventors: Alan R. Stockner, Metamora, Ill.; Billy J. Cagle, Indianapolis, Ind.; James J. Grinsteiner, Union; Martin J. Hower, Elk Grove Village, both of Ill.

[73] Assignee: Caterpillar Inc., Peoria, Ill.

[21] Appl. No.: 104,970

[22] Filed: Aug. 10, 1993

Related U.S. Application Data

[63] Continuation of Ser. No. 776,516, Oct. 11, 1991, abandoned.

[51] Int. Cl.$^6$ ............................................. F02M 37/04
[52] U.S. Cl. ................................... 123/470; 123/446; 123/456
[58] Field of Search ............... 123/446, 447, 456, 500, 123/501, 470

[56] References Cited

U.S. PATENT DOCUMENTS

| | | | |
|---|---|---|---|
| 2,045,556 | 1/1936 | Almen | 22/165 |
| 2,771,869 | 11/1956 | Leach | 123/193 |
| 2,771,870 | 11/1956 | Hutchison | 123/193 |
| 4,121,558 | 10/1978 | Sakakibara et al. | 123/193 |
| 4,499,876 | 2/1985 | Yamamoto | 123/446 |
| 4,522,182 | 6/1985 | Mowbray | 123/470 |
| 4,541,385 | 9/1985 | Eheim | 123/446 |
| 4,628,881 | 12/1986 | Beck | 123/446 |
| 4,878,471 | 11/1989 | Fuchs | 123/446 |
| 4,951,622 | 8/1990 | Takahashi et al. | 123/193 |
| 5,007,401 | 4/1991 | Grohn | 123/470 |
| 5,119,881 | 6/1992 | Cagle | 164/137 |
| 5,123,385 | 6/1992 | Sado et al. | 123/193.5 |
| 5,125,383 | 6/1962 | Meier | 123/470 |
| 5,138,990 | 8/1992 | Smith, Jr. et al. | 123/193.5 |
| 5,184,587 | 2/1993 | Ozeki | 123/193.5 |
| 5,197,532 | 3/1993 | Cagle | 164/137 |

FOREIGN PATENT DOCUMENTS

1277427  10/1961  France .
2202534  5/1974  France .

OTHER PUBLICATIONS

SAE Technical Paper #930269, Hower et al., Mar. 1–5, 1993, The New Navistar T 444E Direct-Injection Turbocharged Diesel Engine.
SAE Technical Paper #930270, Glassey et al., Mar. 1–5, 1993, HEUI-A New Direction for Diesel Engine Fuel Systems.
SAE Technical Paper #930271, Stockner et al., Mar. 1–5, 1993, Development of the HEUI Fuel System Integration of Design.
SAE Technical Paper No. 930600, Yan et al., Mar. 1–5, 1993, Diesel Combustion and Transient Emissions Optimization Using Taguchi.

*Primary Examiner*—Carl S. Miller
*Attorney, Agent, or Firm*—Frank L. Hart

[57] ABSTRACT

An improved arrangement of a hydraulically-actuated injector fuel system is disclosed for an engine having an engine member such as a cylinder head. The system comprises a hydraulically-actuated injector positioned in a injector bore defined in the cylinder head and apparatus for supplying hydraulically actuating fluid to each injector. A hydraulically-actuated injector fuel system requires apparatus for communicating fuel and actuating fluid to each injector. An engine equipped with externally disposed actuating fluid and fuel lines exhibits a complicated and costly construction which is difficult to service. The present invention provides separate actuating fluid and fuel manifolds or passages which are internally disposed in the engine. This hidden and integrated arrangement is not only esthetically pleasing but simplifies assembly and disassembly of the engine and also permits a reduction in cost of the engine.

18 Claims, 2 Drawing Sheets

HYDRAULICALLY-ACTUATED FUEL INJECTOR SYSTEM HAVING SEPARATE INTERNAL ACTUATING FLUID AND FUEL PASSAGES

This is a continuation of application No. 07/776,516, filed on Oct. 11, 1991, now abandoned.

TECHNICAL FIELD

The present invention relates generally to fuel injection systems and, more particularly to hydraulically-actuated fuel injection systems for an internal combustion engine.

Background Art

In U.S. Pat. No. 4,459,959 issued to Terada et al. on Jul. 17, 1984 there is shown a hydraulically-actuated unit injector fuel system in which both fuel and a separate actuating fluid is communicated to each unit injector. However, Terada et al. does not disclose an actual physical embodiment of how the fuel and actuating fluid circuits are arranged on an engine. Such arrangement is important because it can significantly affect the cost and degree of complexity of the engine, particularly with respect to assembly and servicing of the fuel injection system.

In U.S. Pat. No. 3,125,078 issued to Reiners on March 17, 1964 and U.S. Pat. No. 4,267,977 issued to Stockner et al. on May 19, 1981 there are shown mechanically-actuated unit injector fuel systems. In both Reiners and Stockner et al., the fuel is communicated to and from each unit injector by way of internal fuel passages formed in a cylinder head of the engine.

The present invention is directed to overcoming one or more of the problems as set forth above.

Disclosure of the Invention

In one aspect of the present invention a fuel injection system is disclosed for an engine having an engine member. The fuel injection system comprises an injector bore defined in the engine member, a hydraulically-actuated fuel injector positioned in the injector bore, and means for supplying hydraulically actuating fluid to the injector. The hydraulically actuating fluid supplying means includes an actuating fluid manifold associated with the engine member and communicating with the injector.

The hydraulically-actuated injector fuel system of the present invention has separate fuel passages and actuating fluid passages which separately communicate with each injector. An engine equipped with externally disposed fluid passages or lines exhibits a complicated and costly construction which makes it difficult to service individual fuel injectors. The present invention provides separate fuel and actuating fluid passages which are internally disposed in the engine. This arrangement is not only esthetically pleasing but simplifies assembly and disassembly of the engine and also reduces the cost of the engine.

BEST MODE FOR CARRYING OUT THE INVENTION

Figure 1:
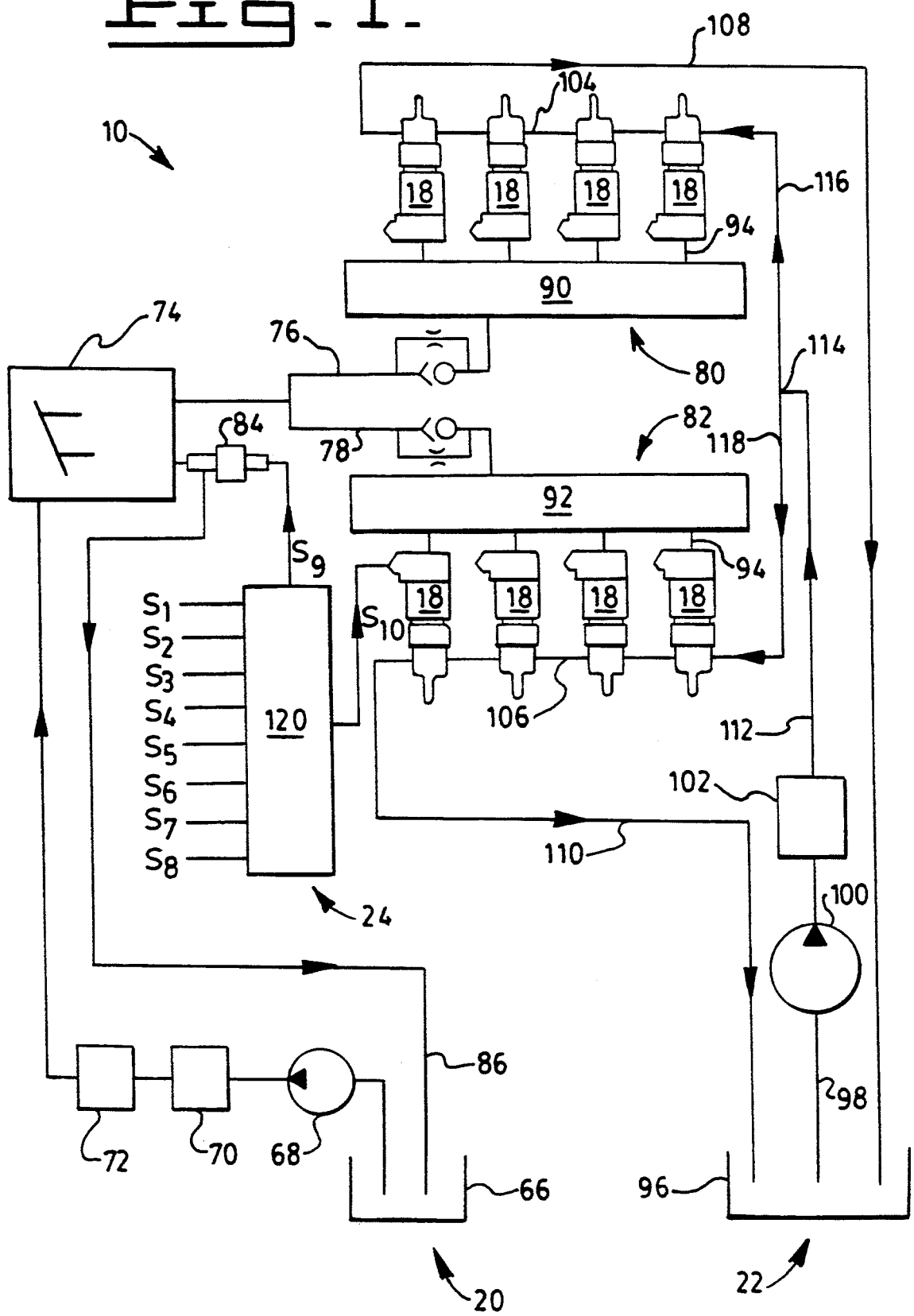
FIG. 1 is a diagrammatic general schematic view of a hydraulically-actuated electronically-controlled unit injector fuel system of the present invention, including both an actuating fluid circuit and a fuel injection circuit, for an internal combustion engine having a plurality of unit injectors.
Figure 2:
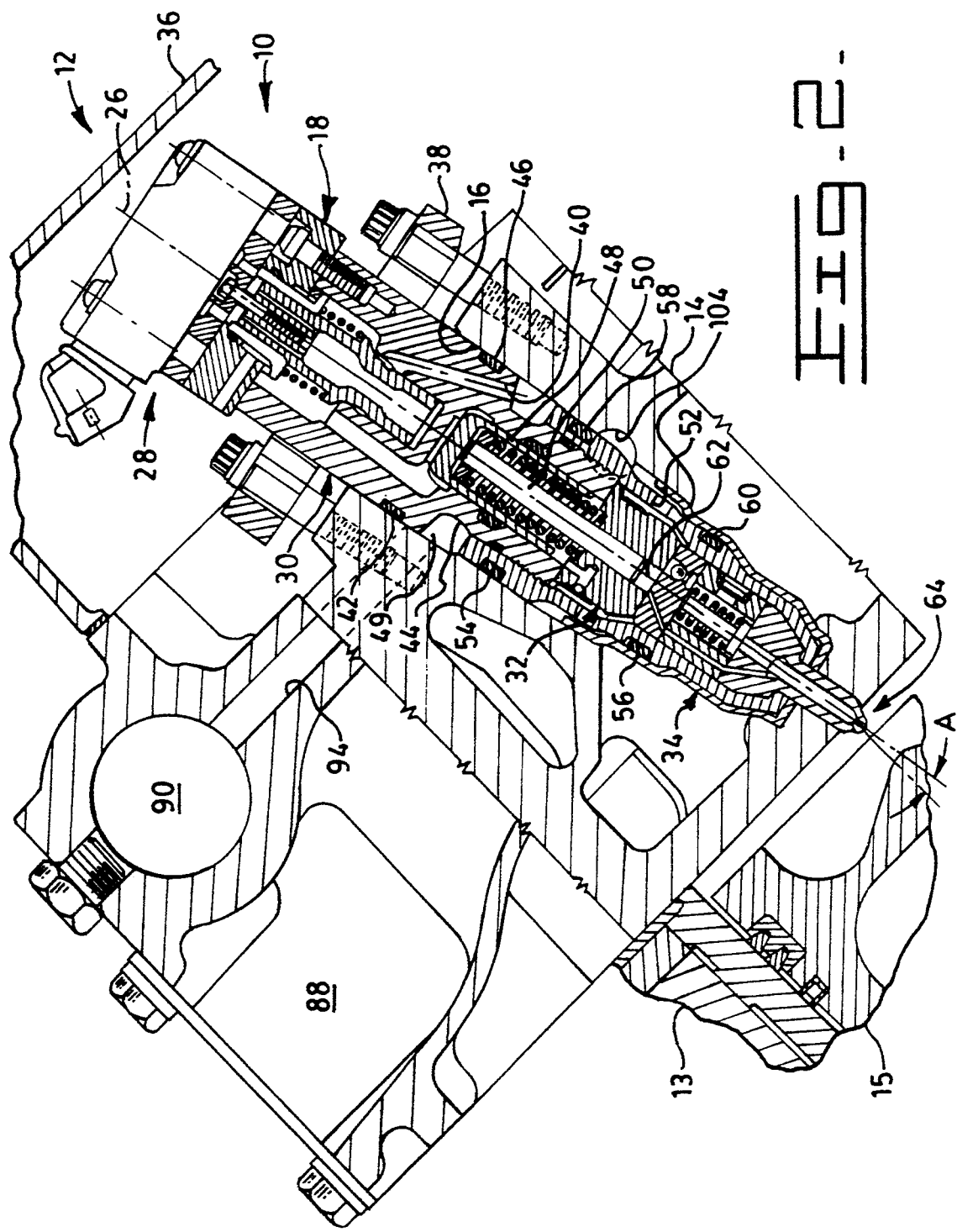
FIG. 2 is a diagrammatic partial cross-sectional view of one embodiment of a unit injector of FIG. 1 as installed in an exemplary internal combustion engine.

Referring to FIGS. 1 and 2, wherein the same reference numerals designate the same elements or features in both Figs., a first embodiment of a hydraulically-actuated electronically-controlled unit injector fuel system 10, hereinafter referred to as a HEUI fuel injection system. The exemplary HEUI fuel injection system 10 is shown in FIGS. 1 and 2 as adapted for a diesel-cycle direct-injection internal combustion combustion engine 12. While a vee-type eight cylinder engine is illustrated in FIG. 1 and described herein, it should be understood that the invention is also applicable to other types of engines, such as in-line cylinder engines and rotary engines, and that the engine may contain fewer or more than eight cylinders or combustion chambers. The exemplary engine 12, only partially shown in FIG. 2, has an engine block 13, one or more (for example, two) engine members preferably in the form of cylinder heads 14, and one or more (for example, eight) reciprocal engine pistons 15. Each cylinder head 14 has one or more (for example, four) unit injector bores 16. Alternatively, the engine member may a separate component with respect to the cylinder head and have one or more of the internal actuating fluid and/or fuel passages described below.

Referring to FIGS. 1 and 2, the HEUI fuel injection system 10 includes one or more hydraulically-actuated electronically-controlled unit injectors 18 adapted to be positioned in a respective unit injector bore 16, means or apparatus 20 for supplying hydraulically actuating fluid to each unit injector 18, means or apparatus 22 for supplying fuel to each unit injector 18, and means or apparatus 24 for electronically controlling the HEUI fuel system 10.

Referring to FIG. 2, each unit injector 18 has a longitudinal axis 26 and includes an actuator and valve assembly 28, a body assembly 30, a barrel assembly 32, and a nozzle and tip assembly 34. The longitudinal axis 26 defines a selected angle A with respect to the axis of the engine combustion chamber. A cylinder head cover 36 is connected over each cylinder head 14 and encloses the respective unit injector(s) 18.

The actuator and valve assembly 28 is provided as a means or apparatus for selectively communicating relatively-high-pressure hydraulically actuating fluid to each unit injector 18 in response to each unit injector 18 sequentially receiving an electronic control signal $S_{10}$ shown in FIG. 1. The As shown in FIG. 2, the body assembly 30 includes an annular unit injector clamp 38, one or more actuating fluid inlet passages 40, first and second annular peripheral grooves 42,44, an externally-disposed o-ring seal 46, and a hydraulically-actuated intensifier piston 48.

The annular unit injector clamp 38 is provided for removably clamping each unit injector 18 to the respective engine cylinder head 14. The generally cylindrical wall of the injector bore 16 and the annular peripheral groove 44 of the unit injector 18 collectively define an annulus 49 which communicates with the actuating fluid inlet passage(s) 40. The o-ring seal 46 is positioned in the first annular peripheral groove 42 and helps to seal actuating fluid communicated to the annulus 49 from an external source of supply.

As shown in FIG. 2, the barrel assembly 32 includes a plunger 50 actuated by the intensifier piston 48 and operable to pump fuel to the nozzle and tip assembly 34.

As shown in FIG. 2, the nozzle and tip assembly 34 includes one or more a fuel inlet passages 52, first and second outer peripheral annular grooves 54,56, first and second o-ring seals 58,60, a fuel pump chamber 62, and one or more injection spray orifices 64.

The first and second o-ring seals 58,60 are positioned in the respective first and second outer peripheral annular grooves 54,56 of the nozzle and tip assembly 34. The first o-ring seal 58 is provided around an intermediate portion of the unit injector 18 in order to also help seal actuating fluid communicated to the annulus 49 from fuel communicated to the barrel assembly 32 of the unit injector 18. The second o-ring seal 60 is provided around a lower end portion of the unit injector 18 in order to seal combustion gas originating from the engine combustion chamber from fuel communicated to the barrel assembly 32.

Preferably, the hydraulically actuating fluid supplying means 20 for the unit injector 18 is separate and independent of the fuel supplying means 22 for the unit injector 18. Referring primarily to FIG. 1, the hydraulically actuating fluid supplying means 20 comprises a main actuating fluid circuit which preferably includes an actuating fluid sump 66, a relatively-low -pressure actuating fluid transfer pump 68, an actuating fluid cooler 70, one or more actuating fluid filters 72, a relatively-high-pressure actuating fluid pump 74, first and second relatively-high-pressure manifold supply passages 76,78, first and second relatively-high-pressure actuating fluid manifolds or feeder passages 80,82, and an electronically-controlled variable pressure regulator 84.

Preferably, the fluid chosen for the actuating fluid is not fuel but is a liquid fluid having a relatively higher viscosity than fuel under the same conditions. For example, the actuating fluid may be engine lubrication oil. In this example, the actuating fluid sump 66 is the engine lubrication oil sump or crankcase.

Preferably, in order to minimize cost, the high pressure pump 74 is a fixed displacement axial piston pump which is mechanically driven by the engine 12. The output pressure of the high pressure pump 74 is controlled by the variable pressure regulator 84. The pressure regulator 84 communicates with the high pressure pump 74 and a return line 86 which communicates with the sump 66. The pressure regulator selectively proportions the amount of actuating fluid flow communicated to the manifolds 80,82 versus the amount of actuating fluid flow communicated to the return line 86. The pressure regulator 84 is provided as a means or apparatus for electronically varying, between selected limits, the pressure of the actuating fluid being supplied to the unit injectors 18 by the manifolds 80,82. Due to the relatively high pressure capacity of the pump 74, the selected actuating fluid pressure communicated to the unit injector 18 may be varied or maintained independent of the engine speed. By varying the actuating fluid pressure, the injection pressure of the fuel delivered by the unit injectors 18 is consequently varied according to the effective area ratio between the intensifier piston 48 and the plunger 50.

Alternatively, the relatively-high-pressure pump 74 may be a variable displacement axial piston pump without the variable pressure regulator 84. In a HEUI fuel injection system 10 for a vee-type engine 12, the high pressure pump 74 is preferably located at the front of the engine 12 at or near the apex of the vee formed by the pair of cylinder heads 14. The outlet of the high pressure pump 74 communicates the first and second manifold supply passages 76,78. Each of the first and second manifold supply passages 76,78 communicates with a respective manifold 80,82.

Preferably, one actuating fluid manifold 80,82 is provided for and associated with each engine member or cylinder head 14 having a bank of unit injectors 18. For example, in a vee-type engine 12, two actuating fluid manifolds 80,82 are provided. During operation of the engine, the manifolds 80,82 serve as a means or apparatus for accumulating pressure developed by the pump pressure accumulators for feeding the respective unit injectors 18.

In the embodiment shown in FIG. 2, each actuating fluid manifold 80,82 is integrally formed with an air intake manifold 88 and this combined unit is bolted or otherwise connected to the respective cylinder head 14. Alternatively, each actuating fluid manifold 80,82 may be another separate component which is connected to the respective cylinder head 14. Alternatively, each actuating fluid manifold 80,82 may be integrally formed with the respective cylinder head 14. One advantage of integrating the actuating fluid manifolds 80,82 as hidden internal passages of the engine 12 is the elimination of external high pressure actuating fluid lines which would add cost and complicate assembly and reliability of the HEUI fuel injection system 10 relative to the engine 12. Another advantage is the neater or relatively uncluttered and more esthetically appealing appearance of the engine 12 which makes it easier to access for maintenance or repair. The uncluttered appearance of the engine also makes it easier to adapt or install for various engine compartments.

Each actuating fluid manifold 80,82 has one common rail passage 90,92 and one or more rail branch passages 94 communicating with the common rail passage 90,92. The number of rail branch passages 94 corresponds to the number of unit injectors 18 positioned in each cylinder head 14. Each common rail passage 90,92 extends across the respective cylinder head 14 in spaced and generally parallel relation to the entire bank of unit injectors 18 positioned in each cylinder head 14. As shown in FIG. 2, each of the rail branch passages 94 also communicates with the respective annulus 49 associated with a respective unit injector 18. The generally symmetrical annulus 49 ensures that the high pressure actuating fluid communicated by the rail branch passage 94 to the unit injector 18 exerts a substantially uniform or balanced pressure all the way around the outer periphery of the unit injector 18. This prevents the unit injector 18 from experiencing an unbalanced high pressure side load if there were no annulus 49 between the rail branch passage 94 and the actuating fluid inlet passages 40 of the unit injector 18.

Referring FIGS. 1 and 2, the fuel supplying means 22 comprises a fuel tank 96, a fuel supply line 98, a fuel transfer and priming pump 100, a means or apparatus 102 for conditioning the fuel, first and second fuel manifolds or feeder passages 104,106 provided for and associated with each engine member or cylinder head 14, and one or more fuel return lines 108,110.

Preferably, the fuel conditioning means 102 includes a fuel heater, a fuel filter, and a fuel/water separator. Fuel is drawn by the fuel transfer pump 100 from the tank 96 and flows through the fuel conditioning means 102 where it is heated, as needed, to a selected temperature, filtered, and separated from water. The fuel conditioning means 102 is connected to a fuel outlet passage 112 which is connected to a tee 114 in the case of a vee-type engine 12. The tee 114 divides the fuel flow into two portions and communicates with a pair of first and second manifold supply passages 116,118. Each fuel manifold supply passage 116,118 communicates with a respective fuel manifold 104,106 defined in each of the cylinder heads 14.

As shown in FIG. 2, each fuel manifold 104,106 is in the form of a common fuel rail passage which is preferably formed as an internal passage of the respective engine member or cylinder head 14. Each common fuel rail passage partially but directly intersects each unit injector bore 16 associated with that engine member or cylinder head 14 and communicates with the fuel inlet passage(s) 52 of the unit injector 18 associated with that unit injector bore 16.

Referring to FIG. 1, the electronic controlling means 24 includes a programmable electronic control module 120 and a means or apparatus for detecting at least parameter and generating a parameter indicative signal ($S_{1-5,7-8}$), hereinafter referred to as an input data signal, which is indicative of the parameter detected. The detecting and generating means preferably includes one or more conventional sensors or transducers which periodically detect one or more parameters such as engine and/or transmission operating conditions and generate corresponding input data signals which are sent to the electronic control module 120. Preferably, such input data signals include engine speed $S_1$, engine crankshaft position $S_2$, engine coolant temperature $S_3$, engine exhaust back pressure $S_4$, air intake manifold pressure $S_5$, actuating fluid manifold pressure $S_6$, and throttle position or desired fuel setting $S_7$. Moreover, if the engine 12 is coupled to an automatic transmission, the input data signals may also include a transmission operating condition indicative signal $S_8$ which, for example, indicates the gear setting of the transmission.

The electronic control module 120 is programmed with various multi-dimensional control strategies or logic maps which take into account the input data and then compute a pair of desired or optimal output control signals $S_9, S_{10}$. One output control signal $S_9$ is the actuating fluid manifold pressure command signal. This signal is directed to the variable pressure regulator 84 in order to adjust the output pressure of the pump 74 which in turn adjusts the pressure of the actuating fluid in the manifolds 80,82 to a desired amount. Adjustment of the actuating fluid pressure has the effect of directly adjusting the fuel injection pressure independent of engine speed. Thus, the output control signal $S_9$ can also be considered the fuel injection pressure command signal.

The other output control signal $S_{10}$ is the fuel delivery command signal which is supplied to the actuator and valve assembly 28 of each selected unit injector 18. The fuel delivery command signal determines the time for starting fuel injection and the quantity of fuel injected during each injection phase. Preferably, the fuel delivery command signal $S_{10}$ produced by the electronic control module 120 is fed to an electronic drive unit (not shown). The electronic drive unit produces a selected waveform that is directed to the actuator and valve assembly 28 of the unit injector 18.

Industrial Applicability

In order to start injection, a fuel delivery command signal $S_{10}$ is sent by the electronic control module 120 to the actuator and valve assembly 28 of a selected unit injector 18. When energized by the fuel delivery command signal $S_{10}$, the actuator and valve assembly 28 selectively communicates pressurized hydraulically actuating fluid from the manifold 80,82 to the intensifier piston 48 via the rail branch passage 94, annulus 49, and actuating fluid inlet passage 40. The pressurized actuating fluid displaces the intensifier piston 48 and fuel plunger 50 downwardly to pressurize fuel in the fuel pump chamber 62 at a selected higher pressure. The unit injector 18 injects fuel through the injection spray orifices 64 when the fuel pressure in the nozzle and tip assembly 34 exceeds the opening pressure of an injection valve positioned therein. Fuel injection is ended by terminating the fuel delivery command signal $S_{10}$ which causes the actuator and valve assembly 28 to depressurize the actuating fluid communicated to the intensifier piston 48 which in turn lowers the pressure of the fuel in the nozzle and tip assembly 34 to below the closing pressure of the injection valve.

The HEUI fuel injection system 10 of the present invention uses an actuating fluid which is separate and independent from the fuel used for injection into the engine 12. The advantages of using engine lubrication oil rather than fuel as the source for the actuating fluid and damping fluid are as follows. Engine lubrication oil has a higher viscosity than fuel and therefore the high pressure actuating fluid pump 74 and body assembly 30 of the unit injector 18 do not require the degree of precision clearances or additional pumping capacity that would be required in order to pump fuel without excessive leakage. This advantage is particularly apparent when restarting an engine that still contains relatively hot actuating fluid. The engine lubrication oil provides better lubrication than does, for example, diesel fuel. Such lubrication is especially needed in the guide and seats of the actuator and valve assembly 28. The engine lubrication oil is also able to utilize the oil drain paths leading to the sump 66 that normally exist in a conventional engine whereas fuel used as actuating and damping fluid would require additional passages or external lines for draining that fuel back to the fuel tank 98. Such oil drain paths as the relatively large air space within the cylinder head cover 36 do not present a restriction to flow. Thus, at the end of injection, the pressure spike which naturally occurs is quickly dissipated rather than possibly being reflected back to the actuator and valve assembly 28 where it could damage relatively delicate components. The venting of high pressure actuating fluid in drain paths which are separate from the fuel supply paths helps prevent variation in fuel delivery and timing of injection between various unit injectors 18.

The HEUI fuel injection system 10 of the present invention provides separate actuating fluid and fuel manifolds 90,92,104,106 which are internally disposed in the engine 12. This hidden and integral arrangement of such passages is not only esthetically pleasing but simplifies assembly and disassembly of the engine and also helps to minimize the cost of the engine.

Other aspects, objects, and advantages of this invention can be obtained from a study of the drawings, the disclosure, and the appended claims.

We claim:

1. A fuel injection system for an internal combustion engine comprising:
   an engine member defining a plurality of injector bores;
   a hydraulically-actuated injector positioned in each injector bore, said injector including an actuating fluid inlet passage and a fuel inlet passage;
   means for supplying hydraulically actuating fluid to each injector, said hydraulically actuating fluid supplying means including an actuating fluid manifold associated with the engine member, said actuating fluid manifold having a common rail passage communicating with the actuating fluid inlet passage of each injector; and
   means for supplying fuel to each injector, said fuel supplying means including a fuel manifold associated with the engine member and communicating with the fuel inlet passage of each injector, said hydraulically actuating fluid supplying means being sealed from fluid communication with the fuel supplying means, wherein each injector and its respective injector bore define an annulus arranged in fluid communication with the actuating fluid inlet passage of the injector, said common rail passage extending through the engine member, said actuating fluid manifold further including a rail branch passage communicating between the common rail passage and the annulus.

2. The fuel injection system of claim 1, wherein the actuating fluid manifold is integrally formed with the engine member.

3. The fuel injection system of claim 1 wherein the actuating fluid manifold is an internal passage integrally formed with the engine member.

4. The fuel injection system of claim 1 wherein the actuating fluid manifold is connected to the engine member.

5. The fuel injection system of claim 1 wherein said fuel manifold is integrally formed with the engine member.

6. The fuel injection system of claim 1 wherein said fuel manifold is an internal passage integrally formed with the engine member.

7. The fuel injection system of claim 1 wherein each injector is a unit injector.

8. The fuel injection system of claim 1 wherein said engine member is a cylinder head.

9. An engine member adapted for an internal combustion engine having a plurality of hydraulically-actuated fuel injectors wherein each injector includes an actuating fluid inlet passage and a fuel inlet passage, said engine member comprising:
   a plurality of injector bores, each bore adapted to receive a respective one of the injectors;
   means for supplying hydraulically actuating fluid to each injector bore, said hydraulically actuating fluid supplying means including an actuating fluid manifold associated with the engine member, said actuating fluid manifold having a common rail passage adapted to communicate with the actuating fluid inlet passage of each injector; and
   means for supplying fuel to each injector bore, said fuel supplying means including a fuel manifold associated with the engine member and adapted to communicate with the fuel inlet passage of each injector, said hydraulically actuating fluid supplying means adapted to be sealed from fluid communication with the fuel supplying means, wherein each injector bore defines an annulus adapted to be in fluid communication with the actuating fluid inlet passage of the respective injector, said common rail passage extending through the engine member, said actuating fluid manifold further including a rail branch passage communicating between the common rail passage and the annulus.

10. The engine member of claim 9 wherein the actuating fluid manifold is integrally formed with the engine member.

11. The engine member of claim 9 wherein the actuating fluid manifold is an internal passage integrally formed with the engine member.

12. The engine member of claim 9 wherein the actuating fluid manifold is connected to the engine member.

13. The engine member of claim 9 wherein said fuel manifold is integrally formed with the engine member.

14. The engine member of claim 9 wherein said fuel manifold is an internal passage integrally formed with the engine member.

15. The engine member of claim 9 wherein each injector is a unit injector.

16. The engine member of claim 9 wherein said engine member is a cylinder head.

17. The fuel injection system of claim 1 wherein said engine member includes a cylinder head.

18. The engine member of claim 9 wherein said engine member includes a cylinder head.

* * * * *

UNITED STATES PATENT AND TRADEMARK OFFICE
CERTIFICATE OF CORRECTION

PATENT NO. : 5,392,749
DATED : February 28, 1995
INVENTOR(S) : Alan R. Stockner, Et Al.

It is certified that error appears in the above-indentified patent and that said Letters Patent is hereby corrected as shown below:

<u>ON THE TITLE PAGE</u> correct the "Attorney, Agent, or Firm" to designate Anthony N. Woloch as Attorney.

Signed and Sealed this

Twenty-sixth Day of September, 1995

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,392,749
DATED : February 28, 1995
INVENTOR(S) : Alan R. Stockner, et al.

It is certified that error appears in the above-indentified patent and that said Letters Patent is hereby corrected as shown below:

On the title page, item [73], please include Navistar International Transportation Corp. as an additional Assignee.

Signed and Sealed this

Nineteenth Day of March, 1996

Attest:

BRUCE LEHMAN

Attesting Officer　　　　Commissioner of Patents and Trademarks